United States Patent
Cleveland et al.

(10) Patent No.: US 9,832,069 B1
(45) Date of Patent: Nov. 28, 2017

(54) PERSISTENCE BASED ON SERVER RESPONSE IN AN IP MULTIMEDIA SUBSYSTEM (IMS)

(75) Inventors: Randall Cleveland, Seattle, WA (US); Mike Schrock, Seattle, WA (US); Donald Glover, Bothell, WA (US); Nat Thirasuttakorn, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 178 days.

(21) Appl. No.: 12/475,307

(22) Filed: May 29, 2009

Related U.S. Application Data

(60) Provisional application No. 61/057,792, filed on May 30, 2008.

(51) Int. Cl.
*G06F 15/16* (2006.01)
*H04L 29/08* (2006.01)

(52) U.S. Cl.
CPC .. *H04L 29/08252* (2013.01); *H04L 29/08162* (2013.01); *H04L 29/08261* (2013.01); *H04L 29/08279* (2013.01); *H04L 67/1006* (2013.01); *H04L 67/1027* (2013.01); *H04L 67/1029* (2013.01)

(58) Field of Classification Search
CPC ......... H04L 29/08252; H04L 29/08261; H04L 29/08279; H04L 29/08162; H04L 29/1034; H04L 67/1027; H04L 67/1029; H04L 67/1006
See application file for complete search history.

(56) References Cited

U.S. PATENT DOCUMENTS

| | | | |
|---|---|---|---|
| 3,689,872 A | 9/1972 | Sieracki | |
| 3,768,726 A | 10/1973 | Hale et al. | |
| 4,747,050 A | 5/1988 | Brachtl | |
| 5,276,444 A | 1/1994 | McNair | |
| 5,319,638 A | 6/1994 | Lin | |
| 5,481,720 A | 1/1996 | Loucks et al. | |
| 5,511,122 A | 4/1996 | Atkinson | |

(Continued)

OTHER PUBLICATIONS

Oracle Communication and Mobility Server, Aug. 2007, http://www.oracle.com/technology/products/ocms/otn_front.html, accessed May 15, 2008, 108 pgs.

(Continued)

*Primary Examiner* — Nam Tran
(74) *Attorney, Agent, or Firm* — John W. Branch; Lowe Graham Jones PLLC

(57) ABSTRACT

Embodiments are directed towards managing persistence of network traffic using deep packet inspections of network response packets from an application server. In one embodiment, the network packets are associated with SIP messages. A traffic management device (TMD) interposed between client devices and a plurality of application servers receives messages from the client device and/or the application servers. The TMD performs a deep packet inspection to determine if a defined key value pair that includes a session identifier is detected. If so, and the message is from the application server, the session identifier is then mapped to an application server identifier to persistently refer each subsequent inbound packet from a client device having the same session identifier to the application server mapped to the session identifier.

20 Claims, 6 Drawing Sheets

(56) References Cited

U.S. PATENT DOCUMENTS

| | | |
|---|---|---|
| 5,553,242 A | 9/1996 | Russell et al. |
| 5,610,905 A | 3/1997 | Murthy et al. |
| 5,749,053 A | 5/1998 | Kusaki et al. |
| 5,825,890 A | 10/1998 | Elgamal et al. |
| 5,898,837 A | 4/1999 | Guttman et al. |
| 5,941,988 A | 8/1999 | Bhagwat et al. |
| 6,023,722 A | 2/2000 | Colyer |
| 6,052,785 A | 4/2000 | Lin et al. |
| 6,061,454 A | 5/2000 | Malik et al. |
| 6,088,451 A | 7/2000 | He et al. |
| 6,105,133 A | 8/2000 | Fielder et al. |
| 6,170,057 B1 | 1/2001 | Inoue et al. |
| 6,182,139 B1 | 1/2001 | Brendel |
| 6,223,287 B1 | 4/2001 | Douglas et al. |
| 6,226,687 B1 | 5/2001 | Harriman et al. |
| 6,253,226 B1 | 6/2001 | Chidambaran et al. |
| 6,263,447 B1 | 7/2001 | French et al. |
| 6,298,380 B1 | 10/2001 | Coile et al. |
| 6,367,009 B1 | 4/2002 | Davis et al. |
| 6,370,584 B1 | 4/2002 | Bestavros et al. |
| 6,393,465 B2 | 5/2002 | Leeds |
| 6,411,986 B1 | 6/2002 | Susai et al. |
| 6,434,618 B1 | 8/2002 | Cohen et al. |
| 6,446,204 B1 | 9/2002 | Pang et al. |
| 6,463,474 B1 | 10/2002 | Fuh et al. |
| 6,584,567 B1 | 6/2003 | Bellwood et al. |
| 6,590,588 B2 | 7/2003 | Lincke et al. |
| 6,629,163 B1 | 9/2003 | Balassanian |
| 6,643,701 B1 | 11/2003 | Aziz et al. |
| 6,650,640 B1 | 11/2003 | Muller et al. |
| 6,654,701 B2 | 11/2003 | Hatley |
| 6,668,327 B1 | 12/2003 | Prabandham et al. |
| 6,674,717 B1 | 1/2004 | Duong-van et al. |
| 6,681,327 B1 | 1/2004 | Jardin |
| 6,691,232 B1 | 2/2004 | Wood et al. |
| 6,697,363 B1 | 2/2004 | Carr |
| 6,704,789 B1 | 3/2004 | Ala-Laurila et al. |
| 6,718,388 B1 | 4/2004 | Yarborough et al. |
| 6,754,662 B1 | 6/2004 | Li |
| 6,754,831 B2 | 6/2004 | Brownell |
| 6,760,782 B1 | 7/2004 | Swales |
| 6,763,384 B1 | 7/2004 | Gupta et al. |
| 6,766,373 B1 | 7/2004 | Beadle et al. |
| 6,768,716 B1 | 7/2004 | Abel et al. |
| 6,768,726 B2 | 7/2004 | Dorenbosch et al. |
| 6,789,203 B1 | 9/2004 | Belissent |
| 6,792,461 B1 | 9/2004 | Hericourt |
| 6,799,276 B1 | 9/2004 | Belissent |
| 6,829,238 B2 | 12/2004 | Tokuyo et al. |
| 6,831,923 B1 | 12/2004 | Laor et al. |
| 6,842,462 B1 | 1/2005 | Ramjee et al. |
| 6,842,860 B1 | 1/2005 | Branstad et al. |
| 6,845,449 B1 | 1/2005 | Carman et al. |
| 6,853,988 B1 | 2/2005 | Dickinson et al. |
| 6,854,117 B1 | 2/2005 | Roberts |
| 6,895,443 B2 | 5/2005 | Aiken |
| 6,915,426 B1 | 7/2005 | Carman et al. |
| 6,928,082 B2 | 8/2005 | Liu et al. |
| 6,934,260 B1 | 8/2005 | Kanuri |
| 6,934,848 B1 | 8/2005 | King et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,976,168 B1 | 12/2005 | Branstad et al. |
| 6,990,592 B2 | 1/2006 | Richmond et al. |
| 7,010,690 B1 | 3/2006 | Hanna et al. |
| 7,010,691 B2 | 3/2006 | Wheeler et al. |
| 7,023,804 B1 | 4/2006 | Younes et al. |
| 7,047,315 B1 | 5/2006 | Srivastava |
| 7,051,330 B1 | 5/2006 | Kaler et al. |
| 7,068,640 B2 | 6/2006 | Kakemizu et al. |
| 7,069,438 B2 | 6/2006 | Balabine et al. |
| 7,092,727 B1 | 8/2006 | Li et al. |
| 7,103,045 B2 | 9/2006 | Lavigne et al. |
| 7,113,993 B1 | 9/2006 | Cappiello et al. |
| 7,116,668 B2 | 10/2006 | Sivalingham |
| 7,127,524 B1 | 10/2006 | Renda et al. |
| 7,139,792 B1 | 11/2006 | Mishra et al. |
| 7,139,811 B2 | 11/2006 | Lev Ran et al. |
| 7,181,493 B2 | 2/2007 | English et al. |
| 7,185,360 B1 | 2/2007 | Anton, Jr. et al. |
| 7,187,771 B1 | 3/2007 | Dickinson et al. |
| 7,215,637 B1 | 5/2007 | Ferguson et al. |
| 7,231,445 B1 | 6/2007 | Aweya et al. |
| 7,231,657 B2 | 6/2007 | Honarvar et al. |
| 7,254,639 B1 | 8/2007 | Siegel et al. |
| 7,260,724 B1 | 8/2007 | Dickinson et al. |
| 7,272,651 B1 * | 9/2007 | Bolding et al. ............... 709/227 |
| 7,280,471 B2 | 10/2007 | Rajagopal et al. |
| 7,287,077 B2 | 10/2007 | Haugh et al. |
| 7,313,627 B1 | 12/2007 | Noble |
| 7,315,513 B2 | 1/2008 | McCann et al. |
| 7,321,926 B1 | 1/2008 | Zhang et al. |
| 7,350,229 B1 | 3/2008 | Lander |
| 7,362,762 B2 | 4/2008 | Williams, Jr. et al. |
| 7,366,755 B1 * | 4/2008 | Cuomo et al. ................ 709/204 |
| 7,421,515 B2 | 9/2008 | Marovich |
| 7,428,637 B1 | 9/2008 | Billman et al. |
| 7,463,637 B2 | 12/2008 | Bou-Diab et al. |
| 7,484,011 B1 | 1/2009 | Agasaveeran et al. |
| 7,496,750 B2 | 2/2009 | Kumar |
| 7,571,313 B2 | 8/2009 | Messerges et al. |
| 7,586,851 B2 | 9/2009 | Panigrahy et al. |
| 7,596,137 B2 | 9/2009 | Bennett |
| 7,619,983 B2 | 11/2009 | Panigrahy |
| 7,623,468 B2 | 11/2009 | Panigrahy et al. |
| 7,624,436 B2 | 11/2009 | Balakrishnan et al. |
| 7,706,778 B2 | 4/2010 | Lowe |
| 7,711,857 B2 | 5/2010 | Balassanian |
| 7,876,704 B1 | 1/2011 | Bims et al. |
| 7,953,974 B2 | 5/2011 | Yamamura et al. |
| 8,009,566 B2 | 8/2011 | Zuk et al. |
| 8,027,637 B1 | 9/2011 | Bims |
| 8,412,778 B2 | 4/2013 | Leeds |
| 8,584,131 B2 | 11/2013 | Wong et al. |
| 9,294,444 B2 | 3/2016 | O'Hare et al. |
| 2001/0001877 A1 | 5/2001 | French et al. |
| 2001/0032254 A1 | 10/2001 | Hawkins |
| 2001/0049741 A1 | 12/2001 | Skene et al. |
| 2001/0049785 A1 | 12/2001 | Kawan et al. |
| 2002/0016777 A1 | 2/2002 | Seamons et al. |
| 2002/0025036 A1 | 2/2002 | Sato |
| 2002/0055980 A1 | 5/2002 | Goddard |
| 2002/0057678 A1 | 5/2002 | Jiang et al. |
| 2002/0059428 A1 | 5/2002 | Susai et al. |
| 2002/0073223 A1 | 6/2002 | Darnell et al. |
| 2002/0076054 A1 | 6/2002 | Fukutomi et al. |
| 2002/0085587 A1 | 7/2002 | Mascolo |
| 2002/0091932 A1 | 7/2002 | Shimizu et al. |
| 2002/0107903 A1 | 8/2002 | Richter et al. |
| 2002/0116646 A1 | 8/2002 | Mont et al. |
| 2002/0116647 A1 | 8/2002 | Mont et al. |
| 2002/0126671 A1 | 9/2002 | Ellis et al. |
| 2002/0133586 A1 | 9/2002 | Shanklin et al. |
| 2002/0144149 A1 | 10/2002 | Hanna et al. |
| 2002/0147916 A1 | 10/2002 | Strongin et al. |
| 2002/0169980 A1 | 11/2002 | Brownell |
| 2003/0018827 A1 | 1/2003 | Guthrie et al. |
| 2003/0043755 A1 | 3/2003 | Mitchell |
| 2003/0050974 A1 | 3/2003 | Mani-Meitav et al. |
| 2003/0061256 A1 | 3/2003 | Mathews et al. |
| 2003/0084289 A1 | 5/2003 | Watanabe |
| 2003/0097484 A1 | 5/2003 | Bahl |
| 2003/0097559 A1 | 5/2003 | Shimizu et al. |
| 2003/0097593 A1 | 5/2003 | Sawa et al. |
| 2003/0105960 A1 | 6/2003 | Takatori et al. |
| 2003/0110230 A1 | 6/2003 | Holdsworth et al. |
| 2003/0115142 A1 | 6/2003 | Brickell et al. |
| 2003/0126029 A1 | 7/2003 | Dastidar et al. |
| 2003/0126437 A1 | 7/2003 | Wheeler et al. |
| 2003/0126439 A1 | 7/2003 | Wheeler et al. |
| 2003/0139183 A1 | 7/2003 | Rantalainen |
| 2003/0140230 A1 | 7/2003 | de Jong et al. |
| 2003/0154406 A1 | 8/2003 | Honarvar et al. |

(56) References Cited

U.S. PATENT DOCUMENTS

| | | |
|---|---|---|
| 2003/0163739 A1 | 8/2003 | Armington et al. |
| 2003/0169859 A1 | 9/2003 | Strathmeyer et al. |
| 2003/0172090 A1 | 9/2003 | Asunmaa et al. |
| 2003/0172164 A1* | 9/2003 | Coughlin ............... 709/227 |
| 2003/0177267 A1 | 9/2003 | Orava et al. |
| 2003/0200433 A1 | 10/2003 | Stirbu |
| 2003/0217171 A1 | 11/2003 | Von Stuermer et al. |
| 2003/0223413 A1 | 12/2003 | Guerrero |
| 2003/0226015 A1 | 12/2003 | Neufeld et al. |
| 2004/0006638 A1 | 1/2004 | Oberlander et al. |
| 2004/0008629 A1 | 1/2004 | Rajagopal et al. |
| 2004/0008664 A1 | 1/2004 | Takahashi et al. |
| 2004/0008728 A1 | 1/2004 | Lee |
| 2004/0010473 A1 | 1/2004 | Hsu et al. |
| 2004/0034773 A1 | 2/2004 | Balabine et al. |
| 2004/0037322 A1 | 2/2004 | Sukonik et al. |
| 2004/0039909 A1 | 2/2004 | Cheng |
| 2004/0049634 A1 | 3/2004 | Nomura et al. |
| 2004/0049687 A1 | 3/2004 | Orsini et al. |
| 2004/0052257 A1 | 3/2004 | Abdo et al. |
| 2004/0083394 A1 | 4/2004 | Brebner et al. |
| 2004/0088585 A1 | 5/2004 | Kaler et al. |
| 2004/0098619 A1 | 5/2004 | Shay |
| 2004/0098620 A1 | 5/2004 | Shay |
| 2004/0107360 A1 | 6/2004 | Herrmann et al. |
| 2004/0107364 A1 | 6/2004 | Shin |
| 2004/0148425 A1 | 7/2004 | Haumont et al. |
| 2004/0167984 A1 | 8/2004 | Herrmann |
| 2004/0177276 A1 | 9/2004 | MacKinnon et al. |
| 2004/0193513 A1 | 9/2004 | Pruss et al. |
| 2004/0213612 A1 | 10/2004 | Hanaoka |
| 2004/0225810 A1 | 11/2004 | Hiratsuka |
| 2004/0225880 A1 | 11/2004 | Mizrah |
| 2004/0228360 A1 | 11/2004 | Bae et al. |
| 2004/0255243 A1 | 12/2004 | Vincent |
| 2004/0260657 A1 | 12/2004 | Cockerham |
| 2004/0268152 A1 | 12/2004 | Xia et al. |
| 2005/0015594 A1 | 1/2005 | Ashley et al. |
| 2005/0021957 A1 | 1/2005 | Gu |
| 2005/0021982 A1 | 1/2005 | Popp et al. |
| 2005/0049934 A1 | 3/2005 | Nakayama et al. |
| 2005/0060295 A1 | 3/2005 | Gould et al. |
| 2005/0063303 A1 | 3/2005 | Samuels et al. |
| 2005/0063307 A1 | 3/2005 | Samuels et al. |
| 2005/0071643 A1 | 3/2005 | Moghe |
| 2005/0074007 A1 | 4/2005 | Samuels et al. |
| 2005/0086068 A1 | 4/2005 | Quigley et al. |
| 2005/0091513 A1 | 4/2005 | Mitomo et al. |
| 2005/0108420 A1 | 5/2005 | Brown et al. |
| 2005/0125692 A1 | 6/2005 | Cox et al. |
| 2005/0132060 A1 | 6/2005 | Mo et al. |
| 2005/0135436 A1 | 6/2005 | Nigam et al. |
| 2005/0144278 A1 | 6/2005 | Atamaniouk |
| 2005/0154914 A1 | 7/2005 | Eguchi et al. |
| 2005/0160289 A1 | 7/2005 | Shay |
| 2005/0177724 A1 | 8/2005 | Ali et al. |
| 2005/0187979 A1 | 8/2005 | Christensen et al. |
| 2005/0193208 A1 | 9/2005 | Charrette et al. |
| 2005/0193211 A1 | 9/2005 | Kurose |
| 2005/0216555 A1 | 9/2005 | English et al. |
| 2005/0238010 A1 | 10/2005 | Panigrahy et al. |
| 2005/0238011 A1 | 10/2005 | Panigrahy |
| 2005/0238012 A1 | 10/2005 | Panigrahy et al. |
| 2005/0238022 A1 | 10/2005 | Panigrahy |
| 2005/0265235 A1 | 12/2005 | Accapadi et al. |
| 2005/0271048 A1 | 12/2005 | Casey |
| 2005/0278775 A1 | 12/2005 | Ross |
| 2006/0005008 A1 | 1/2006 | Kao |
| 2006/0020598 A1 | 1/2006 | Shoolman et al. |
| 2006/0026290 A1* | 2/2006 | Pulito et al. ............. 709/227 |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0036747 A1* | 2/2006 | Galvin et al. ............. 709/228 |
| 2006/0037071 A1 | 2/2006 | Rao et al. |
| 2006/0041507 A1 | 2/2006 | Novack et al. |
| 2006/0053285 A1 | 3/2006 | Kimmel et al. |
| 2006/0062228 A1 | 3/2006 | Ota et al. |
| 2006/0089994 A1 | 4/2006 | Hayes |
| 2006/0123226 A1 | 6/2006 | Kumar et al. |
| 2006/0153228 A1 | 7/2006 | Stahl et al. |
| 2006/0156385 A1 | 7/2006 | Chiviendacz et al. |
| 2006/0161667 A1 | 7/2006 | Umesawa et al. |
| 2006/0174037 A1 | 8/2006 | Bernardi et al. |
| 2006/0174332 A1 | 8/2006 | Bauban et al. |
| 2006/0177061 A1 | 8/2006 | Orsini et al. |
| 2006/0195692 A1 | 8/2006 | Kuhlman et al. |
| 2006/0200855 A1 | 9/2006 | Willis |
| 2006/0227802 A1 | 10/2006 | Du et al. |
| 2006/0233166 A1 | 10/2006 | Bou-Diab et al. |
| 2006/0235973 A1 | 10/2006 | McBride et al. |
| 2006/0239503 A1 | 10/2006 | Petrovic et al. |
| 2006/0242300 A1 | 10/2006 | Yumoto et al. |
| 2006/0242688 A1 | 10/2006 | Paramasivam et al. |
| 2006/0265689 A1 | 11/2006 | Kuznetsov et al. |
| 2006/0276196 A1 | 12/2006 | Jiang et al. |
| 2006/0288404 A1 | 12/2006 | Kirshnan et al. |
| 2006/0291402 A1 | 12/2006 | Yun et al. |
| 2006/0294366 A1 | 12/2006 | Nadalin et al. |
| 2007/0055878 A1 | 3/2007 | Sandhu et al. |
| 2007/0094336 A1 | 4/2007 | Pearson |
| 2007/0094714 A1 | 4/2007 | Bauban et al. |
| 2007/0101418 A1 | 5/2007 | Wood et al. |
| 2007/0121615 A1 | 5/2007 | Weill et al. |
| 2007/0153798 A1 | 7/2007 | Krstulich |
| 2007/0156919 A1 | 7/2007 | Potti et al. |
| 2007/0162394 A1 | 7/2007 | Zager et al. |
| 2007/0220302 A1* | 9/2007 | Cline et al. ............. 714/4 |
| 2007/0250924 A1 | 10/2007 | Ono et al. |
| 2008/0034127 A1 | 2/2008 | Nishio |
| 2008/0253366 A1 | 10/2008 | Zuk et al. |
| 2008/0270618 A1 | 10/2008 | Rosenberg |
| 2008/0320582 A1* | 12/2008 | Chen et al. ............. 726/12 |
| 2009/0063852 A1 | 3/2009 | Messerges et al. |
| 2009/0077618 A1 | 3/2009 | Pearce et al. |
| 2009/0106433 A1 | 4/2009 | Knouse et al. |
| 2009/0252148 A1* | 10/2009 | Dolganow et al. ............. 370/351 |
| 2010/0251343 A1 | 9/2010 | Barrett |

OTHER PUBLICATIONS

Session Initiation Protocol, http://en.wikipedia.org/w/index.php?title=Session_Initiation_Protoc . . . , accessed May 14, 2008, 5 pgs.

IP Multimedia Subsystem, http://en.wikipedia.org/w/index.php?title=IP_Multimedia_Subsyst . . . , accessed May 15, 2008, 8 pgs.

F5 Networks Delivers Blistering Application Traffic Management Performance and Unmatched Intelligence Via New Packet Velocity ASIC and BIG-IP Platforms, F5 Networks, Inc. Press Release dated Oct. 21, 2002, 3 pgs.

Secure and Optimize Oracle 11i E-Business Suite with F5 Solutions, F5 Application Ready Network Guide, Oracle E-Business Suite 11i, Aug. 2007, 2 pgs.

Using the Universal Inspection Engine, Manual Chapter: BIG-IP Solutions Guide v4.6.2: Using the Universal Inspection Engine, 2002, 8 pgs.

Official Communication for U.S. Appl. No. 11/258,551 mailed Aug. 15, 2012.

Official Communication for U.S. Appl. No. 12/199,768 mailed Dec. 16, 2013.

About Computing & Technology, "Wireless/Networking, Nagle algorithm," visited Dec. 6, 2005, 2 pages, <http://compnetworking.about.com/od/tcpip/l/bidef_nagle.htm>.

Acharya et al., "Scalabe Web Request Routing with MPLS," IBM Research Report, IBM Research Division, Dec. 5, 2001, 15 pages.

Australia's Academic and Research Network, "Programs and large MTU, Nagle algorithm," visited Dec. 9, 2005, 3 pages, <http://www.aamet.edu.au/engineering/networkdesign/mtu/programming.html>.

(56) References Cited

OTHER PUBLICATIONS

Berners-Lee, T. et al., RFC 1945, "Hypertext Transfer Protocol—HTTP/1.0," May 1996, 60 pages.
Berners-Lee, T. et al., "Uniform Resource Identifiers (URI): Generic Syntax," IETF RFC 2396, Aug. 1998.
"BIG-IPs Controller with Exclusive OneConnects Content Switching Feature Provides a Breakthrough System for Maximizing Server and Network Performance," F5 Networks, Inc., Press Release: May 8, 2001, accessed Jun. 4, 2002, 3 pages.
Bryhni et al., "A Comparison of Load Balancing Techniques for Scalable Web Servers" IEEE Network, Jul./Aug. 2000, pp. 58-64.
"Consistent Hashing," Wikipedia—the free encyclopedia, http://en.wikipedia.org/w/index.php?title=Consistent_hashing&print . . . , accessed Jul. 25, 2008, 1 page.
"Control Plane," Wikipedia—the free encyclopedia, http://en.wikipedia.org/w/index.php?title=Control_plane&printable=yes, accessed Jul. 31, 2008, 4 pages.
"Editcap—Edit and/or translate the format of capture files," ethereal.com, www.ethereal.com/docs/man-pages/editcap.1.html, accessed Apr. 15, 2004, 3 pages.
"Ethereal—Interactively browse network traffic," ethereal.com, www.ethereal.com/docs/man-pages/ethereal.1.html, accessed Apr. 15, 2004, 29 pages.
"FAQ: Network Intrusion Detection Systems," robertgraham.com, Mar. 21, 2000, www.robertgraham.com/pubs/network-intrusion-detection.html, accessed Apr. 15, 2004.
Fielding, R. et al., "Hypertext Transfer Protocol—HTTP/1.1," Network Working Group, RFC 2068, Jan. 1997, 152 pages.
Fielding, R. et al., "Hypertext Transfer Protocol—HTTP/1.1," W3 Consortium, Jun. 1999, pp. 1-176, http://www.w3.org/Protocols/rfc2616/rfc2616.html.
Fielding, R. et al., RFC 2616, "Hypertext Transfer Protocol—HTTP/1.1," Jun. 1999, 114 pages.
fifi.org, "Manpage of TCP." visited Dec. 9, 2005, 6 pages, <http://www.fifi.org/cgi-bin/man2html/usr/share/man/man7/tcp.7.gz>.
"Forwarding Plane," Wikipedia—the free encyclopedia, http://en.wikipedia.org/w/index.php?title=Forwarding_plane&printa . . . , accessed Jul. 31, 2008.
Freier, A. et al., Netscape Communications Corporation, "The SSL Protocol, Version 3.0," Mar. 1996, 60 pages.
Hinden, R. et al., "Format for Literal IPv6 Addresses in URL's" IETF RFC 2732, Dec. 1999.
Hochmuth, P. "F5 CacheFlow Pump Up Content-Delivery Lines," NetworkWorld, May 4, 2001, http://www.network.com/news/2001/0507cachingonline.html, accessed Jun. 1, 2005, 3 pages.
Jacobson, V. et al., "TCP Extensions for High Performance," May 1992, http://www.faqs.com/rfcs/rfc1323.html.
Kessler, G. et al., RFC 1739, "A Primer on Internet and TCP/IP Tools," Dec. 1994, 46 pages.
Mapp, G., "Transport Protocols—What's Wrong with TCP," Jan. 28, 2004, LCE Lecture at http://www.ice.eng.cam.ac.uk/~gem11,4F5-Lecture4.pdf, pp. 1-60.
Nagle, J., RFC 896, "Congestion control in IP/TCP internetworks," Jan. 6, 1984, 13 pages.
"Network Management," Wikipedia—the free encyclopedia, http://en.wikipedia.org/w/index/php?title=Network_management&pr . . . , accessed Jul. 31, 2008, 3 pages.
"Network Sniffer," linuxmigration.com, www.linuxmigration.com/quickref/admin/ethereal.html, accessed Apr. 15, 2004, 4 pages.
Nielsen, H. F. et al., "Network Performance Effects of HTTP/1.1, CSS1, and PNG," Jun. 24, 1997, W3 Consortium, http://www.w3.org/TR/NOTE-pipelining-970624$Id:pipeline.html, v 1.48 100/10/18 19:38:45 root Exp $, pp. 1-19.
OpenSSL, visited Apr. 12, 2006, 1 pg., <www.openssl.org>.
Paxson, V., RFC 2525, "Known TCP Implementation Problems," Mar. 1999, 61 pages.
Postel, J., "Transmission Control Protocol," Sep. 1981, Information Sciences Institute. University of Southern California, Marina del Rey, California, http://www.faqs.org/rfcs/rfc793.html, pp. 1-21.

Rescorla, E. "SSL and TLS, Designing and Building Secure Systems", 2001, Addison-Wesley, 46 pages.
RSA Laboratories, "PKCS #1 v2.0: RSA Cryoptography Standard," Oct. 1, 1998, 35 pages.
Schroeder et al., "Scalable Web ServerClustering Technologies," IEEE Network May/Jun. 2000, pp. 38-45.
SearchNetworking.com, "Nagle's algorithm," visited Dec. 6, 2005, 3 pages, <http://searchnetworking.techtarget.com/sDefinition/0,,sid7_gci754347,00.html>.
!Session Initiation Protocol, http://en.wikipedia.org/w/index.php?title=Session_Initiation_Protoc . . . , accessed May 14, 2008, 5 pages.
Stevens, W. R., "TCP/IP Illustrated," vol. 1: The Protocols, Addison-Wesley Professional, Dec. 31, 1993, pp. 1-17.
Stevens, W. "TCP Slow Start, Congestion Avoidance, Fast Retransmit, and Fast Recovery Algorithms," Jan. 1997, Sunsite.dk, http://rfc.sunsite.dk/rfc/rfc2001.html, pp. 1-6.
"Telecommunications Network," Wikipedia—the free encyclopedia, http://en.wikipedia.org/w/index.php?title=Telecommunications_net . . . , accessed Jul. 31, 2008, 2 pages.
"Tethereal—Dump and analyze network traffic," ethereal.com, www.ethereal.com/docs/man-pages/tethereal.1.html, accessed Apr. 15, 2004, 11 pages.
Tormasov, A. et al., "TCP/IP options for high-performance data transmission," visited Dec. 9, 2005, 4 pages, <http://bulider.com.com/5100-6732-1050878.html>.
Valloppillil, V. et al., "Cache Array Routing Protocol v1.0," Feb. 1998, http://icp.ircache.net/carp.txt, accessed Jul. 25, 2008, 7 pages.
W3C, "HTTP/1.1 and Nagle's Algorithm," visited Dec. 6, 2006, 3 pages http://www.w3.org/Protocols/HTTP/Performance/Nagle/.
Dierks, T. et al., "The TLS Protocol Version 1.0," RFC 2246, 32 pages Jan. 1999.
Housley, R. et al., "Internet X.509 Public Key Infrastructure Certificate and CRL Profile." RFC 2459, 121 pages, Jan. 1999.
Enger, R. et al., "FYI on a Network management Tool Catalog: Tools for Monitoring and Debugging TCP/IP Internets and Interconnected Devices," RFC 1470, 52 pages, Jun. 1993.
Reardon, M., "A Smarter Session Switch: Arrowpoint's CS Session Switches Boast the Brains Needed for E-Commerce," Data Communications, Jan. 1999, title page, pp. 3, 5, 18.
Hewitt, J. R. et al., "Securities Practice and Electronic Technology," Corporate Securities Series, New York: Law Journal Seminars—Press, 1998, title page, bibliography page, pp. 4.29-4.30.
Official Communication for U.S. Appl. No. 11/258,551 mailed Mar. 3, 2009.
Official Communication for U.S. Appl. No. 11/258,551 mailed Jan. 4, 2010.
Official Communication for U.S. Appl. No. 11/258,551 mailed Aug. 3, 2010.
Official Communication for U.S. Appl. No. 11/258,551 mailed Mar. 31, 2011.
Official Communication for U.S. Appl. No. 12/199,768 mailed Jun. 18, 2010.
Official Communication for U.S. Appl. No. 12/199,768 mailed Nov. 22, 2010.
Official Communication for U.S. Appl. No. 12/199,768 mailed Feb. 1, 2011.
Freier, A. et al., "The SSL Protocol Version 3.0," IETF, Internet Draft, 62 pages, Nov. 18, 1996.
Official Communication for U.S. Appl. No. 11/258,551 mailed Dec. 6, 2012.
Official Communication for U.S. Appl. No. 11/199,768 mailed Jun. 18, 2010.
Official Communication for U.S. Appl. No. 11/199,768 mailed Nov. 22, 2010.
Official Communication for U.S. Appl. No. 11/199,768 mailed Feb. 1, 2011.
Official Communication for U.S. Appl. No. 13/174,237 mailed Mar. 21, 2014.
Official Communication for U.S. Appl. No. 13/174,237 mailed Apr. 6, 2015.

(56) References Cited

OTHER PUBLICATIONS

Office Communication for U.S. Appl. No. 13/174,237 mailed on Sep. 25, 2014.
Office Communication for U.S. Appl. No. 13/174,237 mailed on Dec. 8, 2014.
Office Communication for U.S. Appl. No. 12/199,768 mailed on Apr. 23, 2014.
Office Communication for U.S. Appl. No. 12/199,768 mailed on Sep. 24, 2014.
Office Communication for U.S. Appl. No. 12/199,768 mailed on Jan. 15, 2015.
Office Communication for U.S. Appl. No. 12/199,768 mailed on Apr. 29, 2015.
Official Communication for U.S. Appl. No. 13/174,237 mailed on Aug. 12, 2015, 14 pages.
Official Communication for U.S. Appl. No. 14/935,231 mailed on Mar. 10, 2016, 7 pages.
Official Communication for U.S. Appl. No. 14/935,231 mailed on Sep. 8, 2016, 9 pages.
Official Communication for U.S. Appl. No. 14/935,231 dated Apr. 20, 2017, 11 pages.
Official Communication for U.S. Appl. No. 14/935,231 dated Dec. 7, 2016, 3 pages.

\* cited by examiner

PERSISTENCE BASED ON SERVER RESPONSE IN AN IP MULTIMEDIA SUBSYSTEM (IMS)

CROSS-REFERENCE TO RELATED APPLICATIONS

This application claims the benefit of U.S. Provisional Application Ser. No. 61/057,792 filed on May 30, 2008, entitled "Persistence Based On Server Response In An IP Multimedia Subsystem (IMS)," the benefit of the earlier filing date of which is hereby claimed under 35 U.S.C. §119 (e) and further incorporated by reference.

TECHNICAL FIELD

Embodiments relate generally to network communications, and more particularly, but not exclusively, to managing server response based persistence in network protocol agnostic environment.

BACKGROUND

The enormous growth in network communications has been due at least in part to the wide variety of applications using the network, such as the Internet. For example, today's applications include web sites used by merchants to conduct business, web sites for education activities, and web sites for web logs or blogs. Other applications include text messaging, Voice over Internet Protocol (VoIP), video conferencing, streaming multimedia distributions, online games, and other types of multimedia communications.

Many of the network architectures used to support these applications, and others, are often designed with the intent of providing high availability. One such network architecture is known as IP multimedia subsystem (IMS) architecture. IMS traditionally is a configuration of networking components arranged to provide multimedia applications over IP. IMS as used herein refers to the configurations and specifications described by the wireless standards body 3rd Generation Partnership Project (3GPP), as well as the architectures described by 3rd Generation Partnership Project 2 (3GPP2), and Telecoms & Internet converged Services & Protocols for Advanced Networks (TISPAN). Examples of such architectures, standards and/or specifications may be found at European Telecommunications Standards Institute (ETSI) web site (for TISPAN related specifications), and/or 3GPP websites.

Typically, an IMS configuration might include a plurality of application servers that may reside behind a plurality of proxy servers, which are then configured to route incoming messages to one of a plurality of application servers.

In the typical IMS architecture, client devices may send messages over a network to be managed by one of the application servers configured to provide the multimedia services being requested. As part of such multimedia communications, the client devices might employ a networking protocol, such as Session Initiation Protocol (SIP). SIP is known as a signaling protocol, widely used for setting up and tearing down multimedia communication sessions such as voice and video calls over the network. While SIP messages may be initiated by a client device, SIP messages may also be initiated by one or more of the application servers. For example, as part of an invite for a multimedia conferencing session, an application server may send SIP invite messages to a plurality of client devices. Because the SIP messages may employ an underlying connectionless oriented network protocol, such as User Datagram Protocol (UDP), or the like, routing incoming SIP messages to the same application server has not always been successful using traditional implementations of proxy servers. Thus, allocating workload across the plurality of application servers has often been complicated, expensive, and ineffective.

BRIEF DESCRIPTION OF THE DRAWINGS

Non-limiting and non-exhaustive embodiment are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
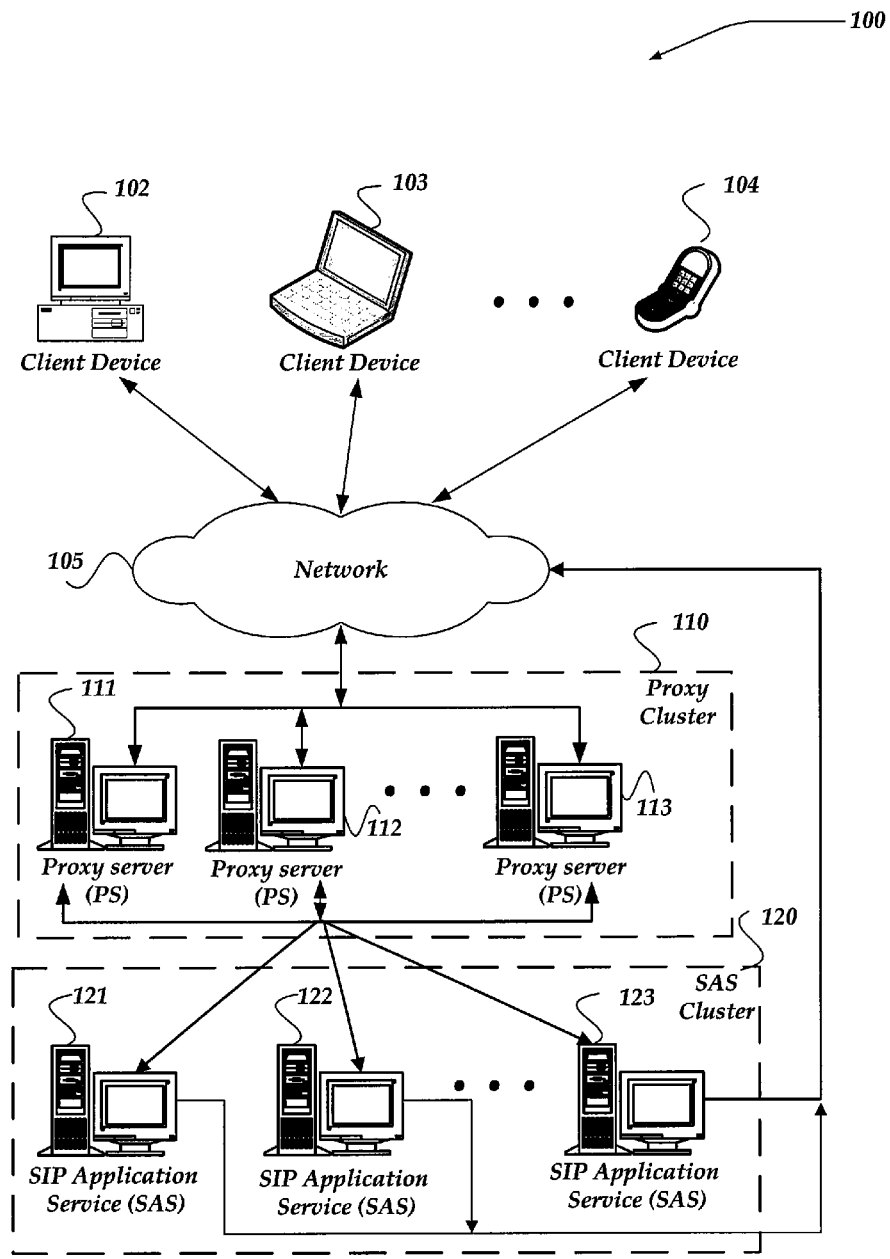
FIG. 1 shows a block diagram illustrating one example of an environment employing a proxy cluster interface layer.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein an "application session" or "session" is a series of application interactions between two or more communication end points over a network that occur within a network connection. Several sessions can use the same network connection, and sessions may span multiple individual connections in parallel or in series.

In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing persistence of network traffic using deep packet inspections of network response packets from an application server. In one embodiment, the network packets are associated with SIP messages. However, the invention is not so limited, and the network packets may also be associated with other networking protocols, including, but not limited to Hypertext Transfer Protocol (HTTP), Network News Transfer Protocol (NNTP), or the like. Moreover, the network packets may further employ UDP, TCP, Stream Control Transmission Protocol (SCTP), or the like. Thus, embodiments of the invention may be viewed as enabling server response based persistence that is network protocol agnostic.

In one embodiment, a traffic management device (TMD) is interposed between client devices and a plurality of application servers. Messages between the client devices and application servers are received through the TMD. When a message is received from a client device a deep packet inspection may be performed that is directed towards examining data within one or more of layers 4 or above within the Open Systems Interconnection (OSI)'s reference model (which is described in more detail in ISO 7498:1984 Open Systems Interconnection—Basic Reference Model, which is available through the International Organization for Standardization), and which is incorporated herein by reference.

If the deep packet inspection detects a defined key value pair that includes a session identifier, the session identifier is then employed to determine to which application server to send the message. If the defined key value pair is not detected then, the message is sent to one of the application servers using a load balancing mechanism to select the application server.

When a response is received from the application server, deep packet inspection is performed to extract the session identifier. In addition, an identifier of the application server is also obtained. The session identifier is then mapped to the application server identifier and saved in a TMD persist table to ensure that subsequent messages received with the same session identifier persists to the same application server.

Illustrative Operating Environment

FIG. 1 shows a block diagram illustrating one example of an environment employing a proxy cluster interface layer. System 100 of FIG. 1 may include more or less components that are illustrated. However, the components shown are sufficient to disclose an illustrative embodiment using a proxy cluster interface layer. As shown, system 100 may represent one embodiment of a representative IP multimedia subsystem (IMS) environment.

As shown in the figure, system 100 includes client devices 102-104, network 105, proxy cluster 110, and SIP application service (SAS) cluster 120. Proxy cluster 110 further includes a plurality of proxy servers (PS) 111-113. SAS cluster 120 further includes a plurality of SAS servers 121-123. Client devices 102-104 are configured to communicate with proxy cluster 110 through network 105. Proxy cluster 110 is in communication with and enables client devices 102-104 to communicate with SAS cluster 120. Although not shown, a network similar to network 105 may be interposed between proxy cluster 110 and SAS cluster 120.

Generally, client devices 102-104 may include virtually any computing device capable of connecting to another computing device and receiving information. In one embodiment, client devices 102-104 may sometimes be called User Agent Clients (UAC). In any event, such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-104 may also include other computing devices, such as personal computers, multiprocessor systems, microprocessor-based or programmable consumer electronics, network devices, and the like. As such, client devices 102-104 may range widely in terms of capabilities and features. For example, a client device configured as a cell phone may have a numeric keypad and a few lines of monochrome LCD display on which only text may be displayed.

Client devices 102-104 also may include at least one client application that is configured to receive content from another computing device, such as from one or more of SAS servers 121-123. The client application may include a capability to provide and receive textual content, graphical content, audio content, alerts, messages, and the like. Moreover, client devices 102-104 may be further configured to communicate a message, such as through a Short Message Service (SMS), Multimedia Message Service (MMS), instant messaging (IM), internet relay chat (IRC), mIRC, Jabber, and the like, between another computing device, and the like.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

In one embodiment, client devices 102-104 may request and/or receive multimedia communications, including, but not limited to voice, video calls, video conferencing, streaming of multimedia, online gaming, or the like, over network 105. In one embodiment, client devices 102-104 might employ a Session Initiation Protocol (SIP), or the like, to enable such communications to be set up and/or torn down.

SIP is described in more detail in RFC 3261, which is available through the IETF's SIP Working Group, and is incorporated herein by reference. Briefly, SIP is a transport independent protocol that may employ UDP, TCP, SCTP, or the like, to enable a signaling portion of a multimedia communication session. SIP is typically employed in conjunction with other protocols that might provide the data content, including, but not limited to Real Time Protocol (RTP), or the like.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, Universal Mobile Telecommunications System (UMTS), and the like. In essence, network 105 may include virtually any wired and/or wireless communication mechanisms by which information may travel between one computing device and another computing device, network, and the like.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

As shown in FIG. 1, traditional implementations of a system employing SIP includes proxy servers 111-113. Proxy servers 111-113 include virtually any network device that is configured and arranged to assist in routing requests from client devices 102-104 to one of SAS servers 121-123. As such proxy servers 111-113 might be configured and arranged using any of a variety of network cluster architectures to ensure high availability. As used herein the term cluster refers to a configuration of loosely coupled network devices that are arranged to cooperate to provide another device with access to a service, resource, or the like.

As such, proxy servers 111-113 may be configured to communicate with each other and/or to provide failover between each other. Moreover data stored by one of proxy servers 111-113 might be made available to the other proxy servers 111-113. For example, in one embodiment, data indicating to which one of SAS servers 121-123 a client message is sent, might be stored by one of proxy servers 111-113 and made available to the other proxy servers upon request.

Devices that may operate as proxy servers 111-113 include but are not limited to personal computers, desktop computers, multiprocessor systems, microprocessor-based or programmable consumer electronics, network PCs, servers, or the like.

SAS servers 121-123 are configured and arranged to provide support to various IMS applications, including, but not limited to voice, video calls, video conferencing, streaming of multimedia, online gaming, or the like. In one embodiment, SAS servers 121-123 may be known as User Application Servers (UAS). In any event, SAS servers 121-123 may employ a variety of networking protocols to provide support for such applications including, but not limited to SIP, RTP, or the like.

Devices that may operate as SAS servers 121-123 include but are not limited to personal computers, desktop computers, multiprocessor systems, microprocessor-based or programmable consumer electronics, network PCs, servers, or the like.

As shown, in one embodiment, SAS servers 121-123 may be configured to receive messages from one of proxy servers 111-113 that was received from one of client devices 102-104. Moreover, SAS servers 121-123 may provide a response to the received message through proxy servers 111-113. However, traditional SAS servers may also initiate messages. Such messages might, for example, be an invite to various client devices, such as client devices 102-104, to join a multimedia session, such as an IM session, a video conferencing session, or the like. In traditional implementations of SAS servers 121-123, such communications may be sent directly towards one or more of client devices 102-104, and thus, not be sent through proxy cluster 110. As such, proxy cluster 110 might be unable to manage such messages, including providing persistence of a session across SAS servers 121-123.

Moreover, typical proxy servers 111-113 are not configured to examine application layers of a message to determine information that may be useable to enable persistence of a session to a SAS server. While some implementations of proxy servers 111-113 attempt to employ headers to manage persistence, such network headers may not be available with some protocols, such as FTP, or the like. Other implementations of proxy servers 111-113 attempt to manage persistence using network addresses within a message. However, when failover of a network device occurs, whether it be a proxy server and/or a SAS server, such persistence information based on network addresses are often lost. Moreover, when a message is sent from a SAS server, the proxy servers 111-113 may be unable to obtain sufficient data to determine which incoming messages from client devices correspond to the outbound message.

Figure 2:
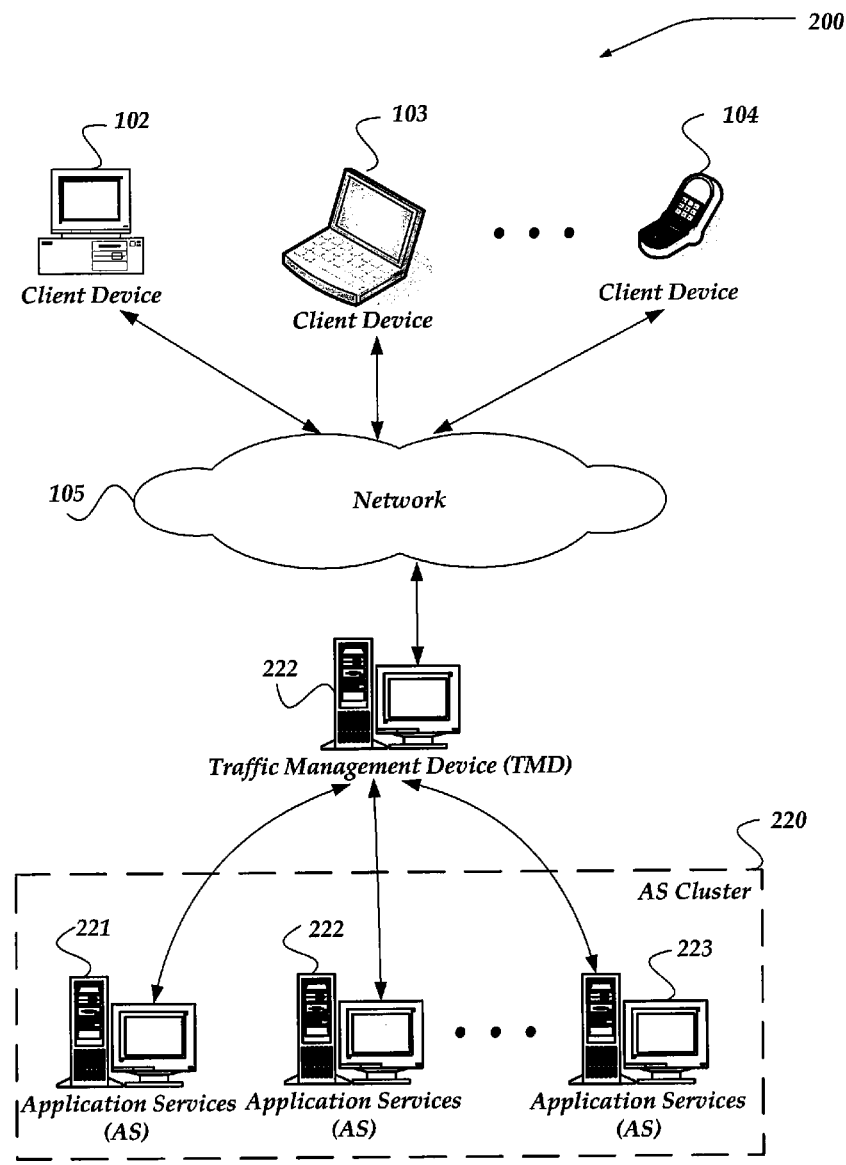
FIG. 2 shows a block diagram illustrating one embodiment of an environment employing a traffic management device (TMD) in absence of the proxy cluster interface layer of FIG. 1.

Thus, FIG. 2 illustrates an environment that overcomes at least the issues identified with system 100 of FIG. 1. As shown, system 200 of FIG. 2 may include more or less components than illustrated. However, the components shown are sufficient to disclose an illustrative embodiment for practicing one or more embodiments of the invention.

As shown in the figure, system 200 includes network 105 which is in communication with and enables communication between client devices 102-104 and Traffic Management Device (TMD) 222. TMD 222 is in further communication with Application Servers (AS) 221-223. In one embodiment, AS 221-223 might be configured and arranged within AS cluster 220.

Client devices 102-104 are configured and arranged to be substantially similar to client devices 102-104 of FIG. 1. Furthermore, network 105 is substantially similar to network device 105 of FIG. 1.

AS servers 221-223 include virtually any network device that may be configured and arranged to provide a variety of application services for use by one or more of client devices 102-104. Such application services include but are not limited to multimedia applications, such as voice, video calls, video conferencing, streaming of multimedia, online gaming; as well as HTTP applications and/or other web based application, FTP applications, database applications, or the like. Devices that may operate as AS servers 221-223 include but are not limited to personal computers, desktop computers, multiprocessor systems, microprocessor-based or programmable consumer electronics, network PCs, servers, or the like.

Moreover, at least one of AS servers 221-223 may provide at least one application service different from that provided by another of AS servers 221-223. That is, for example, AS 221 might provide a database service, while AS 222 might provide VOIP services, while AS 223 might provide text messaging services. However, the invention is not limited to this non-exhaustive example, and other configurations may be employed. Moreover, in one embodiment, each of AS servers 221-223 might still employ SIP to perform session initiations and tear-down activities.

In one embodiment, one or more of AS servers 221-223 might be configured and arranged to operate as a failover or back up network device to another one or more of AS servers 221-223. That is should one of AS servers 221-223 fail, another network device may be configured and arranged to take over the services of the failed device.

Each of AS servers 221-223 may be identified via any of a variety of identifiers, including, but not limited to an IP address, a port number, or other network address or combination of IP address and port number, or even via a unique name.

In one embodiment, AS servers 221-223 may be configured to track and/or otherwise manage communication sessions. In one embodiment, AS servers 221-223 may identify a particular session by inserting data within a communication that identifies a session. For example, in one embodiment, AS servers 221-223 using a SIP message might provide a session identifier that might take a form of a key value pair. One example of a key value pair useable for SIP messaging is described in more detail below in conjunction with FIG. 6. The example, however, is not limited to SIP messaging, and key value pairs for any of a variety of other protocols may also be used. Thus, for example, AS servers 221-223 might insert data into an HTTP communications that is useable to uniquely identify a session. The unique identifier may then be employed in messages from client devices 102-104 to manage sessions as described further below. Moreover, the invention is not limited to key value pairs, and other mechanisms may also be used to detect a unique identifier within a message. Thus, for example, in one embodiment, unique identifiers may be generated that include characteristics, such as a defined character string, or the like, that may be used to detect a presence of the unique identifier.

One embodiment, of TMD 222 is described in more detail below in conjunction with FIG. 3. Briefly, however, TMD 222 may include virtually any device that manages network traffic. Such devices include, for example, routers, proxies, firewalls, load balancers, cache devices, devices that perform network address translation, any combination of the preceding devices, and the like. TMD 222 may, for example, control the flow of data packets delivered to and forwarded from an array of servers, such as AS servers 221-223. TMD 222 may direct a request to a particular server based on network traffic, network topology, capacity of a server, content requested, round-robin, and/or a host of other traffic distribution mechanisms. TMD 222 may receive data packets from and transmit data packets to the Internet, an intranet, or a local area network accessible through another network. TMD 222 may recognize packets that are part of the same communication, flow, and/or stream and may perform special processing on such packets, such as directing them to the same server so that state information is maintained. TMD 222 also may support a wide variety of network applications such as web browsing, email, telephony, streaming multimedia and other traffic that is sent in packets. The BIG-IP® family of traffic managers, by F5 Networks Inc. of Seattle, Wash., are one example of TMDs. Moreover, TMDs are described in more detail in U.S. Pat. No. 7,102,996 to Amdahl, et al. entitled "Method and System for Scaling Network Traffic Managers," which is incorporated herein by reference.

TMD 222 may receive messages from one of client devices 102-104 that is to be directed to one of AS servers 221-223. TMD 222 may inspect the messages to detect whether there is any application layer data indicating that the messages are associated with a pre-existing session. In one embodiment, TMD 222 might use an inspection engine component to perform deep packet inspection of data at an OSI layer 4 and/or above to detect a unique identifier associated with the pre-existing session. If none is detected, TMD 222 may select one of AS servers 221-223 to which the messages are to be forwarded.

TMD 222 may also receive a message from one of AS servers 221-223 that is to be directed to one or more of client devices 102-104. TMD 222 may inspect the message to detect a unique identifier associated with a session. In one embodiment, TMD 222 might use the inspection engine component to perform deep packet inspection of data at an OSI layer 4 and/or above to detect the unique identifier associated with the pre-existing session. TMD 222 may further examine the message to obtain an identifier for the AS servers 221-223 sending the received message. TMD 222 may then map the unique identifier for the session to the AS server identifier. Such mapping may be saved in one or more TMD persist tables. Such TMD persist table, is not limited to a table format, however, and other formats, and/or mapping structures may also be used, including but not limited to a file, directory structure, a database, a spreadsheet, a script, a program, or the like. As mentioned earlier, system 200 of FIG. 2 may include more or less components than illustrated, such as one or more TMDs 222, and consequently the TMD persist table is not limited to a single TMD device or simply a mirrored pair of TMD devices, and thus may be shared between a number of TMDs, including clustered TMDs working in concert across LAN, WAN, Internet or like networks in support of application or IMS deployments in or across environments with virtual machines, multiple domains, widely distributed datacenters, or the like. In one embodiment, TMD 222 may employ processes such as those described below in conjunction with FIGS. 4-5 to perform at least some of its actions.

In one embodiment, TMD 222 may also be configured to modify, rewrite, and/or otherwise transcode an identifier detected within a message. TMD 222 may further modify the TMD persist table to reflect such modification. Such modification of a detected identifier may be performed for example, based on a detected health monitoring condition, another rule, a communication from another network device, or the like. Such examples are non-exhaustive, however, and other reasons for modifying a detected identifier may also arise.

In one embodiment, if a failover of one of AS servers 221-223 is detected, TMD 222 or another network device may update the TMD persist table by replacing the identifier of the failed AS server with an identifier of a backup AS server. In this manner, the backup AS server using other session state information may transparently assume the role of the failed AS server.

Devices that may operate as TMD 222 include but are not limited to personal computers, desktop computers, multi-processor systems, microprocessor-based or programmable consumer electronics, network PCs, servers, network switches, routers, network appliances, or the like.

Illustrative Network Device

Figure 3:
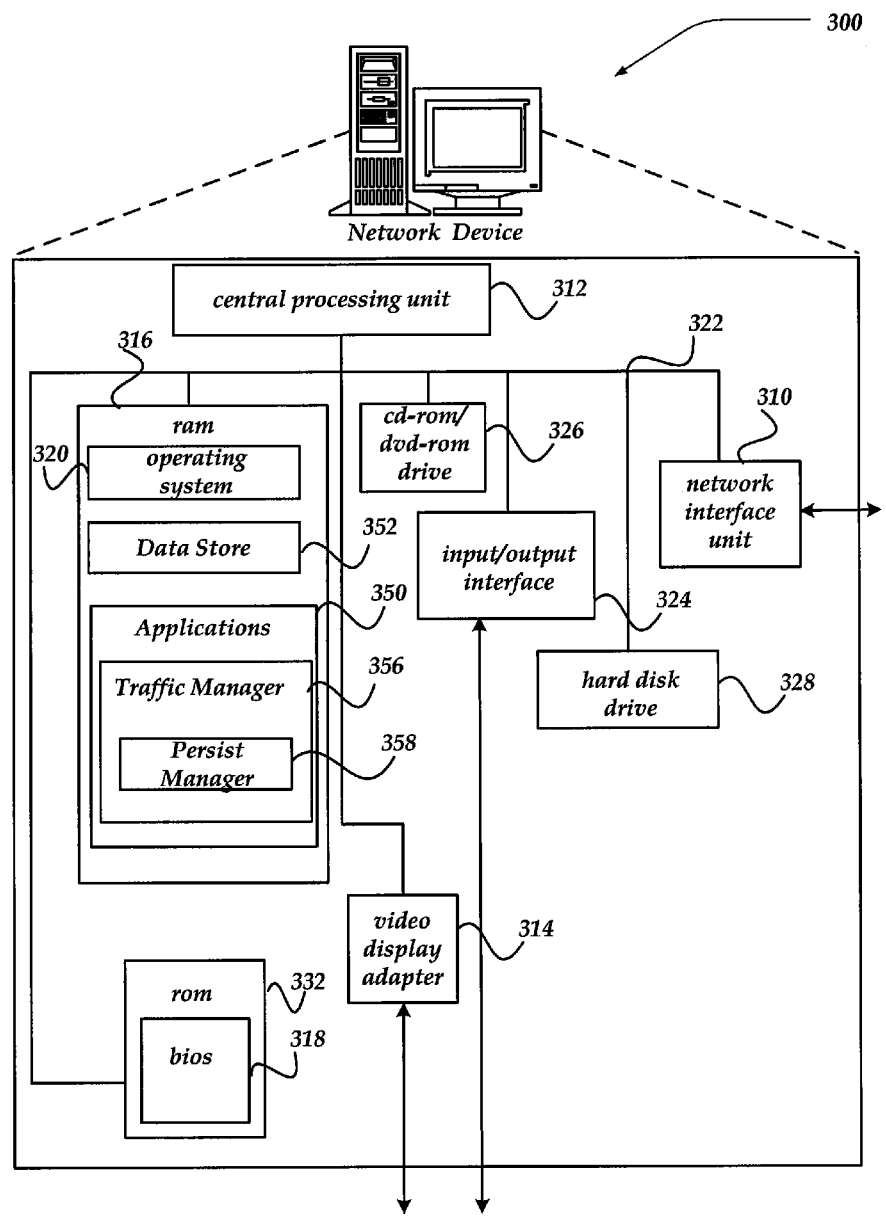
FIG. 3 illustrates one embodiment of a network device for managing persistence based on a server response in absence of the proxy cluster interface layer.

FIG. 3 shows one embodiment of a network device, according to one embodiment of the invention. Network device 300 may include many more or less components than those shown. The components shown, however, are sufficient to disclose an illustrative embodiment for practicing one or more embodiments of the invention. Network device 300 may represent, for example, TMD 222 of FIG. 2.

Network device 300 includes at least one central processing unit (cpu) 312, video display adapter 314, and a mass memory, all in communication with each other via buss 322. The mass memory generally includes RAM 316, ROM 332, and one or more permanent mass storage devices, such as hard disk drive 328, tape drive, optical drive, and/or floppy disk drive. The mass memory stores operating system 320 and bios 318 for controlling the operation of network device 300

As illustrated in FIG. 3, network device 300 also can communicate with the Internet, or some other communications network via network interface unit 310, which is constructed for use with various communication protocols including the IP protocol. Network interface unit 310 is sometimes known as a transceiver, transceiving device, or network interface card (NIC).

The mass memory 316, 326, 328, and 332 described herein and shown in FIG. 3 illustrates another type of computer-readable media, namely computer readable, machine readable storage media, or processor readable storage media. Computer readable storage media may include volatile, nonvolatile, removable, and non-removable media implemented in any method or technology for storage of information, such as computer readable instructions, or machine-readable instructions, data structures, program modules, or other data, which may be obtained and/or executed by at least one central processing unit 312 to perform one or more portions of the processes described below in more detail in conjunction with FIGS. 4-5. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer executable instructions, and which can be accessed by a computing device.

The mass memory may also store other types of program code and data as applications 350, which may be are loaded into mass memory and run on operating system 320. Examples of applications 350 may include email client/server programs, routing programs, schedulers, web servers, calendars, database programs, and any other type of application program. Applications 350 may also include traffic manager 356. In one embodiment, traffic manager 356 may include a persist manager 358. However, the invention is not so limited. For example, in another embodiment, persist manager 358 may be configured as a separate component from traffic manager 356.

In one embodiment, ram 316 may include data store 352; however, data store 352 may also reside completely, or in part, in another mass memory storage media, including, but not limited to a storage device readable by cd-rom/dvd-rom drive 326, on hard disk drive 328, or even on a computer readable storage medium on another network device and possibly accessible by network device 300 through such as network interface unit 310.

Data store 352 may include virtually any mechanism configured and arranged to store data and/or computer readable instructions. As such, data store 352 may be configured to store and/or otherwise manage a TMD persist table useable to manage mappings of session identifiers or the like, to an identifier of an application server to enable persistence of a session to a particular application server (that is until the application server is replaced by another application server for any of a variety of reasons, including, but not limited to a failover).

Traffic manager 356 is configured and arranged to include any component configured to manage network traffic between network devices. In one embodiment, traffic manager 356 may receive messages in the form of network packets. In one embodiment, the message may span multiple packets. In such instance, traffic manager 356 is configured to recognize packets that are associated with each other and to manage the packets as a flow of related packets.

In one embodiment, traffic manager 356 might determine that a message received from a network device is directed towards one application server within a plurality of application servers. Traffic manager 356 might determine if the message includes information that is useable to direct the message to an application server to ensure server persistence of messages associated with a same session, unique identifier, or the like. If traffic manager 356 determines that the message is currently unassociated with a session, traffic manager 356 may provide the message to an application server based on any of a plurality of load-balancing metrics, including network traffic, network topology, capacity of a server, characteristic of the request, a round-robin metric, or the like.

In one embodiment, traffic manager 356 might employ persist manager 358 to manage server response based persistence of messages. That is, persist manager 358 is configured to examine messages to detect application layer data useable to manage the TMD persist table. In one embodiment persist manager 358 may perform deep packet inspections using an inspection engine component, or the like.

Although persist manager 358 is illustrated as a component within traffic manager 356, the invention is not so limited. For example, persist manager 358 might be a distinct component from traffic manger 356 that is called by traffic manager 356 as appropriate to perform server response based persistence.

Network device 300 may also include an SMTP handler application for transmitting and receiving e-mail, an HTTP handler application for receiving and handing HTTP requests, a RTP handler application for receiving and handing RTP requests, an SIP requests and/or responses, and an HTTPS handler application for handling secure connections. The HTTPS handler application may initiate communication with an external application in a secure fashion. Moreover, network device 300 may further include applications that support virtually any secure connection, including TLS, TTLS, EAP, SSL, IPSec, and the like.

Network device 300 may also include input/output interface 324 for communicating with external devices, such as a mouse, keyboard, scanner, or other input/output devices not shown in FIG. 3. Likewise, network device 300 may further include additional mass storage facilities such as cd-rom/dvd-rom drive 326 and hard disk drive 328. Hard disk drive 328 may be utilized to store, among other things, application programs, databases, and the like in the same manner as the other mass memory components described above.

In one embodiment, the network device 300 may include at least one Application Specific Integrated Circuit (ASIC) chip (not shown). The ASIC chip can include logic that performs some or all of the actions of network device 300. For example, in one embodiment, the ASIC chip can perform a number of packet processing functions for incoming and/or outgoing packets. In one embodiment, the ASIC chip can perform at least a portion of the logic to enable the operation of traffic manager 356, persist manager 358, or any other component.

In one embodiment, network device 300 can further include one or more field-programmable gate arrays (FPGA) (not shown), instead of, or in addition to, the ASIC chip. A number of functions of network device 300 can be performed by the ASIC chip, the FPGA, by CPU 312 with instructions stored in memory, or by any combination of the ASIC chip, FPGA, and a CPU.

Generalized Operation

Figure 4:
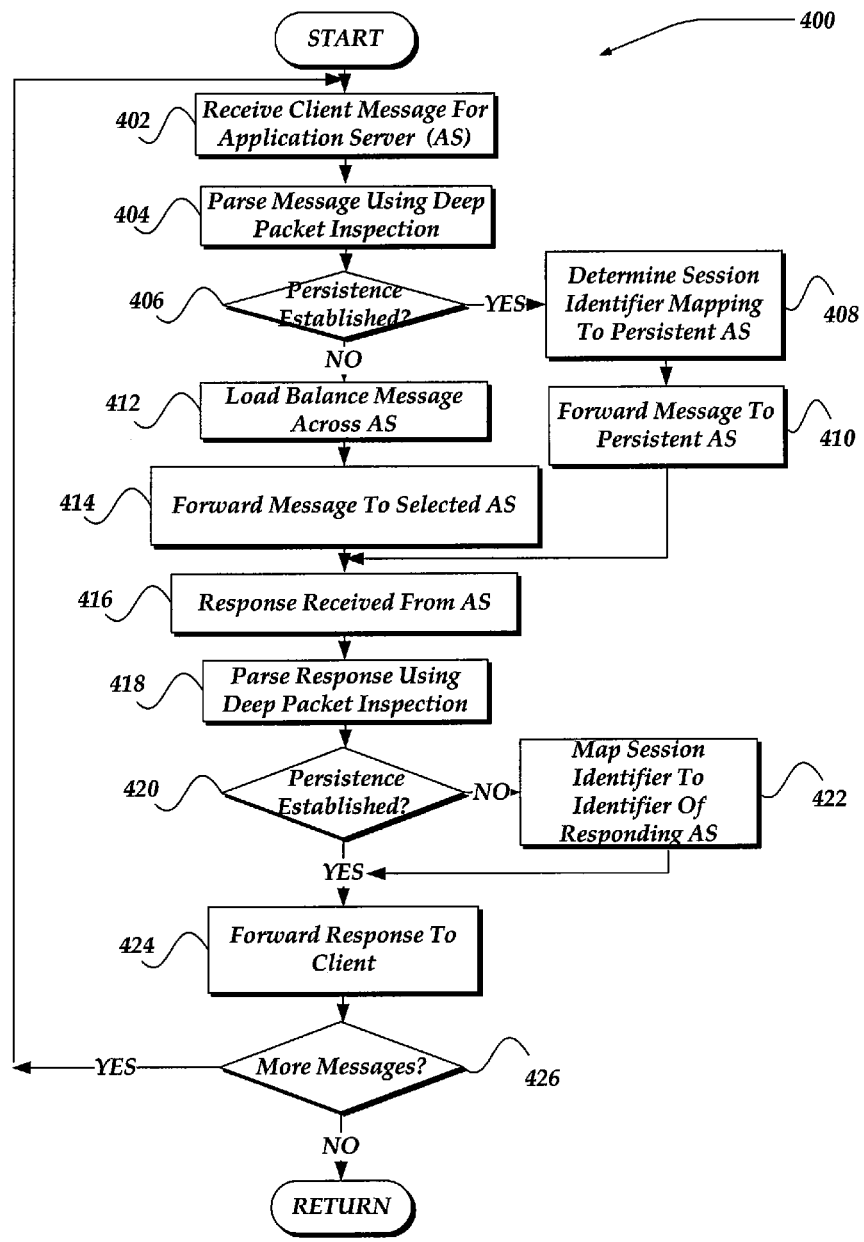
FIG. 4 illustrates a logical flow diagram generally showing one embodiment of a process for managing server response based persistence for client initiated communications.

The operation of certain aspects of the invention will now be described with respect to FIGS. 4-5. FIG. 4 illustrates a logical flow diagram generally showing one embodiment of a process for managing server response based persistence for client initiated communications. Process 400 of FIG. 4 may be implemented within traffic management device 222 of FIG. 1.

Process 400 begins, after a start block, at block 402, where a message is received from a client device that is to be directed to an application server (AS). Processing continues next to block 404, where the message is parsed using deep packet inspections. As noted, the deep packet inspection is performed to access data within one or more of layers 4 or above of the OSI reference model. Such deep packet inspection may be performed by inspecting data that may span more than one received network packet, or more reside completely within a single network packet. Moreover, such deep packet inspection may employ a variety of mechanisms for searching the received message for specific 'application layer' data. For example, one embodiment of a use of a universal inspection engine using a set of iRule syntax that may be useable with appropriate modifications is described in more detail F5, Networks, Inc.'s document entitled "BIG-IP Solutions Guide v4.6.2: Using the Universal Inspection Engine," which is incorporated herein by reference. Such universal inspection engine might be a component, for example, within persist manager 358 of FIG. 3. The invention is not constrained to this non-exhaustive example, and other mechanisms may also be employed, including, but not limited to use of a script, program, or the like. In any event, a simplified, non-exhaustive iRule syntax might appear as:

```
Rule app_string {
    if (findstr (SIP_data, "Session-ID") ==found) {
        send to existing_persist_server
    }
    else {
        perform balancing
    }}
```

In the above non-limiting example, the deep packet inspection rule might examine SIP data within the message for an existing session identifier indicating that the incoming message is associated with an existing application session. If the field includes a session identifier, a value for the session-identifier may then be extracted. That is, if the client message is associated with a session that is already balanced across the plurality of servers, then extract the session identifier that is useable to indicate which server to send the message, such that the session persists with the selected server. The invention is not limited to SIP data, however, and an appropriate implementation of the above non-exhaustive example, might enable examination of other types of application data, including, but not limited to HTTP data, TCP data, UDP data, or the like. For example, in another embodiment, a deep packet inspection at a transport layer might be performed using:

if (findstr (Transport_data, "Session-ID")==found . . . .

In any event, processing flows to decision block 406, where a determination is made whether the deep packet inspection determined that persistence across the plurality of servers is currently established. If so, then processing flows to block 408; otherwise, processing continues to block 412.

At block 408, the session-identifier that may be extracted at block 404 is used to determine which persistent application server (AS) the session identifier is mapped to. It should be noted at this juncture, that if an application server fails for any of a variety of reasons, the sessions managed by that application server may be failed over to another application server. By modifying a TMD persist table that maps the session identifiers to application servers, such fail overs may be managed transparently to process 400. That is, through another process, the TMD persist table might readily be revised to replace the failed application server's identifier with the replacement application server's identifier. Then at block 408, examining the same TMD persist table may be performed without a need to consult additional tables, or the like, due to failover situations.

In any event, using the session identifier, the TMD persist table may be examined to obtain an identifier of the application server for which to persist the session. Moving to block 410, the message may then be forwarded to the application server based on the obtained identifier. Processing then continues to block 416.

At block 412, it was determined that the message from the client device is not currently associated with an existing session. This may be determined, for example, because the message application data did not include a session identifier. As such, at block 412, any of a variety of load balancing mechanisms may be used to select an application server from among a plurality of application servers. Such load balancing mechanisms, include but are not limited to network traffic, network topology, capacity of a server, content requested, round robin, and/or a host of other traffic distribution mechanisms. Processing moves next to block 414, where the message is forwarded to the selected application server.

At block 416, a response is received from one of the application servers. A deep packet inspection is then performed on the received response. Similar to above, the response is parsed to examine and extract a session identifier from within layer 4 or above data within the response. Because the response is from an application server, it is expected that the response includes a session identifier. This is because the application servers are configured and arranged to construct a response that includes session identifiers. Thus, processing continues to decision block 420.

At decision block 420 a determination is made whether the response is associated with an established session that is currently mapped to persist with the sending application server. This may be readily determined by employing the extracted session identifier from block 418 to search the TMD persist table. If the session identifier is found in the TMD persist table then the session is determined to already for mapped. Otherwise, mapping is to be performed. Thus, if the session identifier is found in the TMD persist table, processing flows to block 424; otherwise, processing branches to block 422.

At block 422, an identifier for the sending application server is obtained from the response. Such identifier may include, but is not limited to an IP source address, port source number, some other network identifier, and/or combination of network identifiers, a server name, or the like. The obtained server identifier is then mapped to the extracted session identifier and placed into the TMD persist table. It may be noted at this point, that removal of server persist mappings from the TMD persist table may occur based on a variety of criteria, including, but not limited to a defined time period where the session identifier is not received from an application server or a client device, a message sent from another component that indicates that the session is no longer to persist, or the like. Processing then flows to block 424.

At block 424, the response is forwarded to the client. It is noted that, in one embodiment, the response may be forwarded without adding information to the response. By avoiding adding information to the response, the size of the response doesn't change. This may be relevant in at least some protocols. For example, if the application protocol is SIP, it may employ either TCP or UDP as its underlying transport layer protocol. When the application server sends the response it may examine a size of the response to determine whether to use TCP or UDP. If the size is below one value, the application server may employ UDP, and if it is above the value, then the application server employs TCP. Thus, should another component, such as the TMD, a proxy device, or the like, add information to the response, such as might be useable to track the response, then the size of the response could change sufficiently to force a switch in the underlying transport layer protocol. However, such as switch would be unknown by the application server, which may then result in problems for the application server. Thus, one embodiment is directed towards employing existing information within the response to manage persistence rather than attempting to add information. However, in another embodiment, an IP address, port number, or the like, may be modified at block 424, such as might arise during a network address and/or port translation, or the like.

In any event, processing then proceeds to decision block 426, where a determination is made whether there are more messages to be managed. If so, processing loops back to block 402 to continue process 400; otherwise, processing may return to a calling process to perform other actions.

Figure 5:
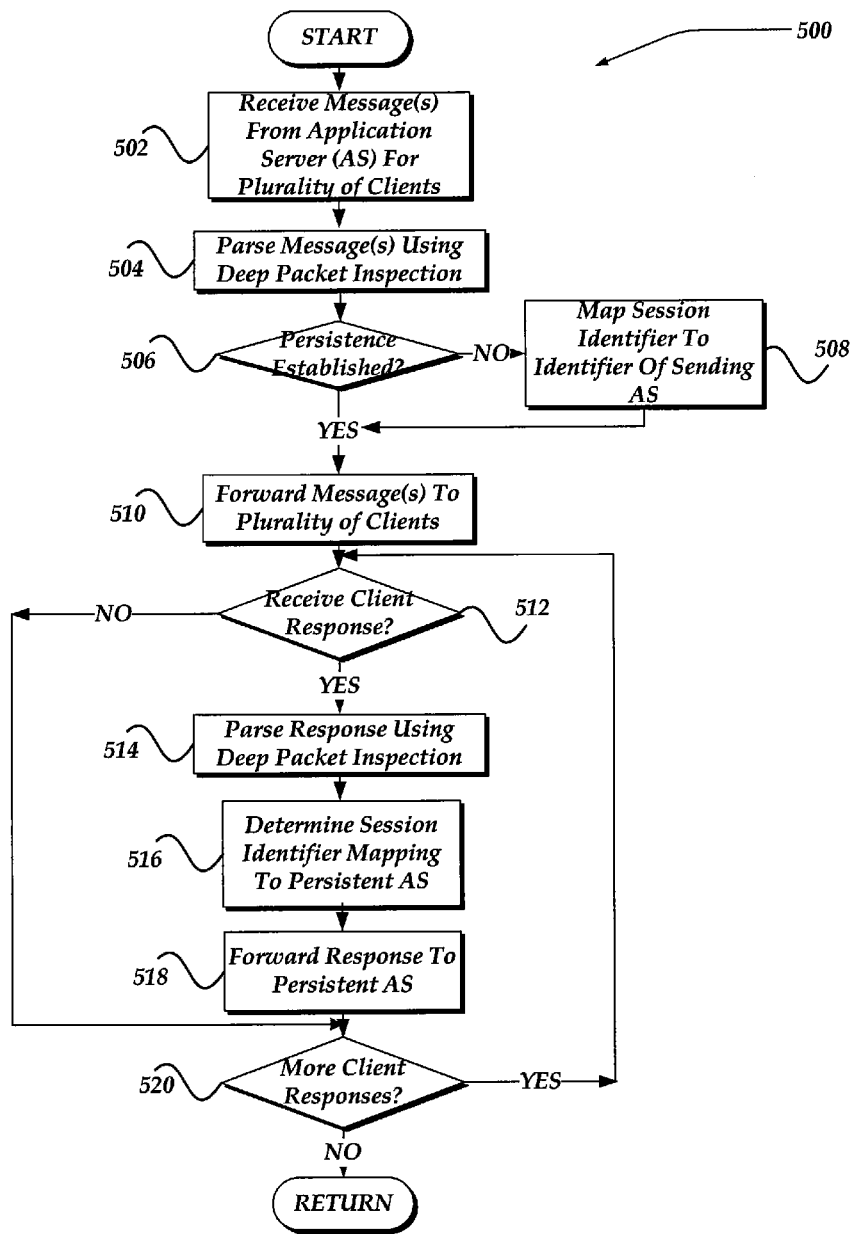
FIG. 5 illustrates a logical flow diagram generally showing one embodiment of a process for managing server response based persistence for situations where the server initiates messaging with client devices.

FIG. 5 illustrates a logical flow diagram generally showing one embodiment of a process for managing server response based persistence for situations where the server provides messages to client devices. Such situations might arise, for example, where the application server might operate to send an invite messages to a plurality of client devices. Such invites might include, but are not limited to invites to join a video conference session, audio conference session, a multi-party IM session, or the like. In any event, process 500 of FIG. 5 may be implemented within TMD 222 of FIG. 2.

Process 500 begins, after a start block, at block 502, where a message is received from an application server (AS) that is directed to a plurality of client devices. In one embodiment, the message might actually be a plurality of messages, one per client device. Thus, at block 502, a plurality of messages might actually be received, in one embodiment, where each message is directed to one of a plurality of different client devices. In another embodiment, the message might be sent using a broadcasting protocol. In any event, processing flows to block 504, where the message(s) are parsed using deep packet inspection as described above to extract a session identifier.

Figure 6:
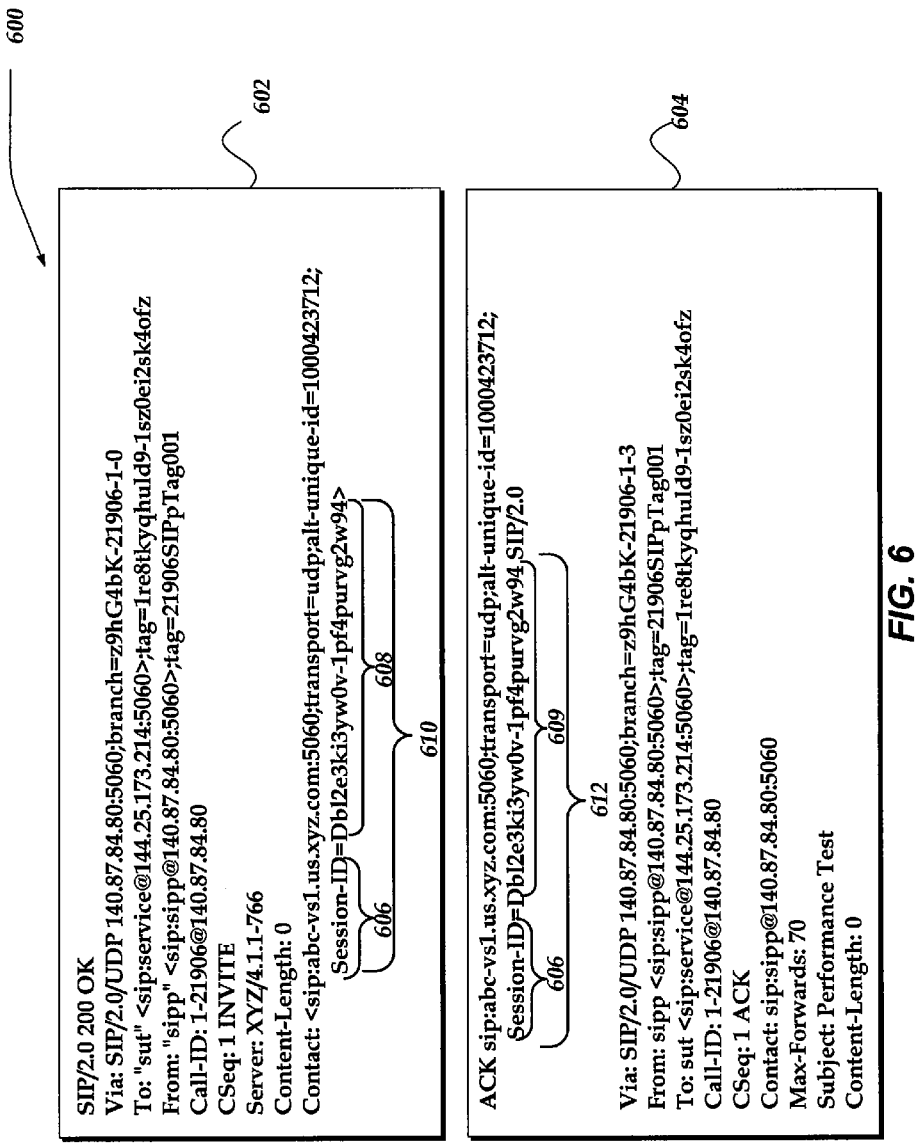
FIG. 6 illustrates one embodiment of application data within SIP messages usable as a non-exhaustive example of a use of session identifiers.

Referring to FIG. 6, shown are SIP messages from an application server (message 602) and a response from a client device (message 604). As seen in application server's message 602, the application server includes a session-identifier key value pair 610. The key 606 in this instance is shown as Session-ID, wherein the session identifier 608 represents the corresponding value in key value pair 610. Thus, as described above, a deep packet inspection of message 602 may be performed to locate key 606 and extract session identifier 608. It should be recognized, however, that other key value pairs may also be used. Moreover, while a key value pair is described, the invention is not so limited. For example, in another embodiment a search within virtually any location with the application layer data may be performed to detect a pre-defined string of characters, or the like. Thus, in one embodiment, key value pair 610, or other form of unique identifier may be located virtually anywhere within the application layer data. In addition, the unique identifier may be located in other than packet header data. Moreover, while the non-exhaustive example 600 of FIG. 6 is illustrated using SIP messages, other protocols may also be employed. Thus, the invention is not to be limited by this example.

Processing continues next to decision block 506, where a determination is made whether persistence to the application server is currently established. Such determination may be made by examining the TMD persist table using the session identifier to determine whether an entry exists. If so, then, processing flows to block 510; otherwise, processing flows to block 508.

At block 508, the TMD persist table is updated by adding an entry for the extracted session identifier, which is mapped to an identifier associated with the application server, such as a network address, a server name, or the like. Processing flows next to block 510.

At block 510, the message(s) are forwarded to the plurality of client devices. Processing then continues to decision block 512, where a determination is made whether a response from a client device is received. If so, processing continues to block 514; otherwise, processing loops to decision block 520.

At block 514, the client device's message is parsed using deep packet inspection to extract the session identifier within the application layer (e.g., per the TCP/IP reference model). Although not illustrated here, if the client message does not include a session identifier, it may be assumed that the message is new, or not part of the responses to the application server's message. In that instance, the message may be sent to a selected application server within the plurality of application servers based on any of a variety of possible load balancing mechanisms, such as described above in conjunction with process 400.

However, if at block 514, a session identifier is detected and extracted, then processing continues to block 516, where the TMD persist table is searched to find the mapping of the session identifier to a persistent application server. Processing continues to block 518, where the message is then forwarded to the identified persistent application server. Thus, the mapping enables actions to persistently refer each incoming message having the same session identifier or other unique identifier to the application server that is mapped to the session identifier.

Referring briefly, again to client response message 604 of FIG. 6, it may be seen that session-identifier key value pair 612 includes key 606 of Session-ID with a corresponding value of session identifier 609.

Processing flows next to decision block 520, where a determination is made whether there are to be expected more client responses. If so, processing may loop back to decision block 512; otherwise, processing may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing communications over a network, comprising:
   a memory arranged to store data and instructions;
   an input interface for receiving requests and sending responses; and
   a processor arranged to enable actions embodied by at least a portion of the stored instructions, the actions comprising:
      receiving each outbound packet from an application server within a plurality of application servers; and
      when persistence information for a pre-existing communication session between the application server and the network device is absent from a table managed by the network device, performing actions, including:
         performing a deep packet inspection at a layer four or above of the OSI reference model within one or more outbound packets to identify application layer data having a session identifier that uniquely identifies the communication session, wherein the session identifier is a pre-defined string of characters that is located anywhere within application layer data;
         mapping the session identifier to an identifier of the application server as persistence information in the table; and
         using the mapping in the table to persistently refer each subsequent inbound packet from a client device to the corresponding application server; and
      employing a failure of the application server that is detected in the communication session to update the persistent information in the table to identify another application server that transparently assumes the role of the failed application server in the communication session with the network device.

2. The network device of claim 1, wherein the deep packet inspection further comprises examining data within an application layer for a defined key value pair.

3. The network device of claim 1, wherein the outbound packet from the application server is a Session Initiation Protocol (SIP) packet.

4. The network device of claim 1, wherein the processor is arranged to perform actions, further comprising:
   performing a deep packet inspection on each inbound packet;
   if an inbound packet is without a session identifier within the inbound packet as determined by the deep packet inspection, selecting another application server from within the plurality of application servers using a load balancing mechanism to forward the inbound packet.

5. The network device of claim 1, wherein at least one of the inbound or outbound packets is includes Hypertext Transfer Protocol (HTTP) data.

6. A non-transitory machine-readable storage medium having machine-executable instructions stored thereon, which when executed by at least one processor for a traffic management device that is interposed between client devices and a plurality of application servers, causes the at least one processor to perform actions to manage communications over a network, the actions comprising:

receiving a message from a client device; and
when persistence information for a pre-existing communication session between the application server and the traffic management device is absent from a table managed by the traffic management device, performing actions, including:
performing a deep packet inspection at a layer four or above of the OSI reference model within one or more outbound packets to identify application layer data having a session identifier that uniquely identifies the communication session, wherein the session identifier is a pre-defined string of characters that is located anywhere within application layer data;
mapping the session identifier to an identifier of the application server as persistence information in the table; and
using the mapping in the table to persistently refer each subsequent inbound packet from a client device to the corresponding application server; and
employing a failure of the application server that is detected in the communication session, to update the persistent information in the table to identify another application server that transparently assumes the role of the failed application server in the communication session with the traffic management device.

7. The non-transitory machine-readable storage medium of claim 6, wherein the at least one processor performs one or more further actions, comprising:
if the application server mapped to the session identifier fails, revising the mapping of the session identifier to identifier associated with another application server, wherein the other application server is configured as a failover device.

8. The non-transitory machine-readable storage medium of claim 6, wherein at least one of the message or the response includes at least one of Session Initiation Protocol (SIP) data, or Hypertext Transfer Protocol (HTTP) data.

9. The non-transitory machine-readable storage medium of claim 6, wherein the at least one processor performs further actions, comprising:
receiving a message from one of the application servers wherein the message is other than a response message, and wherein the message is to be sent to a plurality of client devices;
performing a deep packet inspection a layer four or above of the OSI reference model within the message's application layer data to identify a session identifier that uniquely identifies a communication session;
mapping the session identifier to an identifier of the sending application server; and
using the mapping to persistently refer each subsequent response from the plurality of client devices having the same session identifier within the response to the application server mapped to the session identifier.

10. The non-transitory machine-readable storage medium of claim 6, wherein the communication session is associated with a multimedia session.

11. The non-transitory machine-readable storage medium of claim 6, wherein detecting the session identifier further comprises detecting a key value pair.

12. A method executed on a traffic management device that is interposed between a plurality of client devices and a plurality of application servers, the method when executed enables the traffic management device to manage a request for a managing communications over a network, comprising:

receiving a plurality of messages, from an application server, each message being directed to a different client device within the plurality of client devices; and
when persistence information for a pre-existing communication session between the application server and the traffic management device is absent from a table managed by the traffic management device, performing actions, including:
performing a deep packet inspection at a layer four or above of the OSI reference model within one or more outbound packets to identify application layer data having a session identifier that uniquely identifies the communication session, wherein the session identifier is a pre-defined string of characters that is located anywhere within application layer data;
mapping the session identifier to an identifier of the application server as persistence information in the table; and
using the mapping in the table to persistently refer each subsequent inbound packet from a client device to the corresponding application server; and
employing a failure of the application server that is detected in the communication session to update the persistent information in the table to identify another application server that transparently assumes the role of the failed application server in the communication session with the traffic management device.

13. The method of claim 12, wherein the communication session is associated with at least one of an IP multimedia session.

14. The method of claim 12, further comprising:
receiving another message from one of the plurality of client devices;
performing an inspection of application layer data within the message to determine if a unique session identifier is present within the application layer data of the message;
when the unique identifier is undetected within the message based on the inspection, forwarding the other message to one of a plurality of application servers based on a load balancing mechanism; and
upon receiving a response from the load balanced application server, mapping another unique session identifier from within an application layer of the response such that subsequent messages from the client devices having the same unique session identifier are persistently communicated to the load balanced application server.

15. The method of claim 12, wherein performing an inspection of the application layer data further comprises searching for a predefined string of characters within any location of the application layer data.

16. The method of claim 12, wherein message is associated with a Session Initiation Protocol (SIP) message.

17. A system for managing communications over a network, comprising:
a plurality of application servers; and
a traffic management device that is interposed between the plurality of application servers and client devices, and is configured and arranged to perform actions, including:
causing each message from an application server within the plurality of application servers to be received by the traffic management device; and
when persistence information for a pre-existing communication session between the application server and the traffic management device is absent from a table managed by the traffic management device, performing actions, including:

performing a deep packet inspection at a layer four or above of the OSI reference model within one or more outbound packets to identify application layer data having a session identifier that uniquely identifies the communication session, wherein the session identifier is a pre-defined string of characters that is located anywhere within application layer data;

mapping the session identifier to an identifier of the application server as persistence information in the table; and using the mapping in the table to persistently refer each subsequent inbound packet from a client device to the corresponding application server; and employing a failure of the application server that is detected in the communication session to update the persistent information in the table to identify another application server that transparently assumes the role of the failed application server in the communication session with the traffic management device.

18. The system of claim 17, wherein message is associated with a Session Initiation Protocol (SIP) message.

19. The system of claim 17, wherein detecting the unique session identifier within the application layer data further comprises detecting the unique session identifier independent of a defined location of the application layer data.

20. The system of claim 17, wherein the message is associated with an HTTP message.

* * * * *

UNITED STATES PATENT AND TRADEMARK OFFICE
CERTIFICATE OF CORRECTION

PATENT NO. : 9,832,069 B1
APPLICATION NO. : 12/475307
DATED : November 28, 2017
INVENTOR(S) : Cleveland et al.

It is certified that error appears in the above-identified patent and that said Letters Patent is hereby corrected as shown below:

On the Title Page

On Page 3, item (56), under "OTHER PUBLICATIONS", in Column 2, Line 24, delete ""Scalabe" and insert -- "Scalable --, therefor.

On Page 4, item (56), under "OTHER PUBLICATIONS", in Column 2, Lines 10-12, delete "!Session Initiation Protocol, http://en.wikipedia.org/w/index.php?title=Session.sub.--Initiation.sub.--- Protoc . . . , accessed May 14, 2008, 5 pages.".

In the Specification

In Column 2, Lines 28-29, delete "communications; and" and insert -- communications; --, therefor.

In Column 7, Line 21, delete "device 105" and insert -- 105 --, therefor.

In Column 9, Line 45, delete "buss" and insert -- bus --, therefor.

In Column 9, Line 51, delete "300" and insert -- 300. --, therefor.

In Column 11, Line 8, delete "manger" and insert -- manager --, therefor.

In Column 12, Line 41, delete "found" and insert -- found) --, therefor.

In the Claims

In Column 16, Line 59, in Claim 5, delete "is includes" and insert -- includes --, therefor.

In Column 17, Line 22, in Claim 6, delete "session, to" and insert -- session to --, therefor.

Signed and Sealed this
Second Day of July, 2019

Andrei Iancu
*Director of the United States Patent and Trademark Office*

CERTIFICATE OF CORRECTION (continued)
U.S. Pat. No. 9,832,069 B1

In Column 17, Line 46, in Claim 9, delete "inspection a" and insert -- inspection at a --, therefor.

In Column 17, Line 66, in Claim 12, delete "for a managing" and insert -- for managing --, therefor.